US006468412B2

(12) United States Patent
Bryan et al.

(10) Patent No.: US 6,468,412 B2
(45) Date of Patent: Oct. 22, 2002

(54) APPARATUS AND METHOD FOR VENTING HYDROGEN FROM AN ELECTROLYTIC CELL

(75) Inventors: Jared K. Bryan, Neptune, NJ (US); Gregory E. Stockinger, Pompton Plains, NJ (US); Manor M. Parikh, Robbinsville, NJ (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/741,936

(22) Filed: Dec. 20, 2000

(65) Prior Publication Data

US 2002/0108865 A1 Aug. 15, 2002

(51) Int. Cl.[7] ................................................. C25B 1/26
(52) U.S. Cl. ...................... 205/500; 205/637; 204/242; 204/277; 204/278
(58) Field of Search ............................... 205/500, 637; 204/242, 277, 278

(56) References Cited

U.S. PATENT DOCUMENTS

| 3,925,174 A | * | 12/1975 | Eng et al. .................... 205/500 |
| 4,510,026 A | * | 4/1985 | Spaziante ................... 205/500 |
| 5,616,234 A | * | 4/1997 | Rhees et al. ................. 205/687 |

OTHER PUBLICATIONS

United States Filter Wallace & Tiernan Products Operation & Maintenance Manual, Jul., 1998, Jan., 1999, Feb., 1999, Apr., 1999, and Jun., 1999, New Jersey, U.S.A.

* cited by examiner

Primary Examiner—Arun S. Phasge
(74) Attorney, Agent, or Firm—Wolf, Greenfield & Sacks, P.C.

(57) ABSTRACT

An apparatus and method for venting hydrogen from an electrolytic cell. A brine solution is supplied to an electrolytic cell where hypochlorite and hydrogen gas are produced. A non-combustible gas is introduced into the electrolyzer containing the electrolytic cell and the concentration of hydrogen in the electrolyzer is reduced to a concentration below the LEL of hydrogen.

22 Claims, 4 Drawing Sheets

APPARATUS AND METHOD FOR VENTING HYDROGEN FROM AN ELECTROLYTIC CELL

BACKGROUND OF THE INVENTION

1. Field of the Invention

The present invention relates to an apparatus and method for venting hydrogen from an electrolytic cell and, more particularly, to an apparatus and method for venting hydrogen from a system producing hypochlorite by electrolysis.

2. Description of the Related Art

Various techniques are available for disinfecting a water supply. Common among these methods is the addition of chemical disinfectants, primarily oxidants, to reduce the microbial content of water. Chlorine, in various forms, is a widely used oxidant, and several techniques exist for introducing it into a water supply. For example, chlorine gas may be injected directly into water, or a solution of hypochlorite ($OCl^-$), the anion of hydrolyzed chlorine, may be added to the water. Hypochlorite solution may be produced on site and added on demand to the water being treated. The ability to produce a hypochlorite solution locally makes this technique particularly attractive and economically efficient.

One method of producing hypochlorite is through the use of an electrolytic cell. One or more electrolytic cells, including anodes and cathodes, are housed within a device called an electrolyzer. A brine solution, that is, a solution containing dissolved chloride, and typically 3% w/w chloride, is fed to the electrolyzer. The application of current to the electrolytic cell containing brine solution results in an electrolytic reaction that produces hypochlorite that may then be transferred to a water supply at a concentration that is capable of reducing the microbial content of the water to an acceptable level.

One commercially available apparatus for producing hypochlorite in this manner is the OSEC®-LC hypochlorite production system (United States Filter Corporation, Palm Desert, Calif.). Such a system 100, as illustrated in FIG. 1, includes an electrolyzer 20 and requires a source of brine 40 which may be a synthetic source such as a salt saturator or a natural source such as sea water. Brine supplied by a salt saturator is typically diluted by mixing with water in the electrolytic cell. As the efficiency and useful life of electrolytic cells may be reduced by the presence of undesirable dissolved constituents in the water and/or brine supply, synthetic brine sources are often used and pretreatment devices are employed to upgrade the water supply prior to its use. Such pretreatment devices often include a water softener 110 to reduce hardness in the water feeding the salt saturator 40 and the electrolyzer 20.

To produce a hypochlorite solution, typically a solution of sodium hypochlorite, a brine solution is fed into an electrolytic cell 29 where electrolysis takes place. The electrolytic cell contains cathodes and anodes in quantity and size to support the electrolytic current required to produce a supply of hypochlorite at a rate adequate to supply the particular water system with which the apparatus is being used. To produce a brine of appropriate concentration, a concentrated chloride solution is typically pumped into the electrolytic cell from the salt saturator 40 and is mixed with a regulated flow of water to result in a 3% brine solution. The regulated flow of water may be provided through flow controller 47 and may be monitored via flow indicator 46. The resulting hypochlorite solution is transferred through a product outlet 23 into a tube that leads to a storage tank 50. From the storage tank 50, the hypochlorite solution may be pumped into the water supply at a rate and concentration adequate to supply the desired concentration of chlorine.

In addition to producing hypochlorite from the brine solution, the electrolytic process results in the production of hydrogen gas, as a byproduct. This combustible gas passes with the product through conduit 24 into the product storage tank where it separates from the liquid product. To remove hydrogen gas, the hypochlorite storage tank 50 is provided with a vent 51 that allows the hydrogen, under atmospheric pressure, to exit the system. An air blower 120 may also be connected to the storage tank in order to provide a flow of air to the interior of the storage tank and thereby aid in venting of the hydrogen from the storage tank 50. Depending upon the efficiency of the system, from about 5 to about 15 cubic feet of hydrogen, at atmospheric pressure, are produced for each pound of chlorine that is generated by the system, and some hypochlorite production systems may produce upwards of 2,000 pounds of chlorine (as hypochlorite) per day. Typically, hypochlorite production systems are provided with electronic controls to monitor the operation of the electrolytic cell as well as the water softener, salt saturator, sodium hypochlorite storage tank, and any other modules that may be included. The hypochlorite is typically made in a batch process, and the electrolytic cell is de-powered once the hypochlorite storage tank 50 is fill. Once the electrolyzer 29 has been turned off, it is often desirable to drain the electrolytic cell to inhibit galvanically induced corrosion of the metal components in the cell, and to facilitate this, the cell of the electrolyzer is often fitted with a cell drain 25 that is used to empty the electrolyzer either to waste or to the product storage tank 50.

SUMMARY OF THE INVENTION

The present invention is directed to an apparatus and method for venting hydrogen from an electrolytic cell. The apparatus includes an electrolyzer having an electrolyte inlet and a product outlet, at least one electrolytic cell positioned in the electrolyzer, a vent, and a non-combustible gas source in fluid communication with the electrolyzer.

In another embodiment, the apparatus includes an electrolyzer having an electrolyte inlet and a product outlet, at least one electrolytic cell, a vent, and a vacuum source in communication with the vent.

In another embodiment of the invention, a system for producing hypochlorite is provided. The system includes an electrolyzer having at least one electrolytic cell in fluid communication with a product outlet, a brine inlet, a non-combustible gas source, a brine source, a storage tank and a vent.

In another embodiment, the present invention provides for a method of producing hypochlorite. The method includes the steps of supplying a brine solution to an electrolytic cell in an electrolyzer, producing hypochlorite ion and hydrogen gas in the electrolyzer, introducing a non-combustible gas, diluting the hydrogen in the electrolyzer to a concentration below a combustible limit, and venting the diluted hydrogen from the electrolyzer.

In another embodiment, the present invention provides for an electrolyzer. The electrolyzer has an electrolyte inlet and a product outlet as well as an electrolytic cell positioned in the electrolyzer. A retention area is positioned within the electrolyzer and is downstream of the electrolytic cell.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
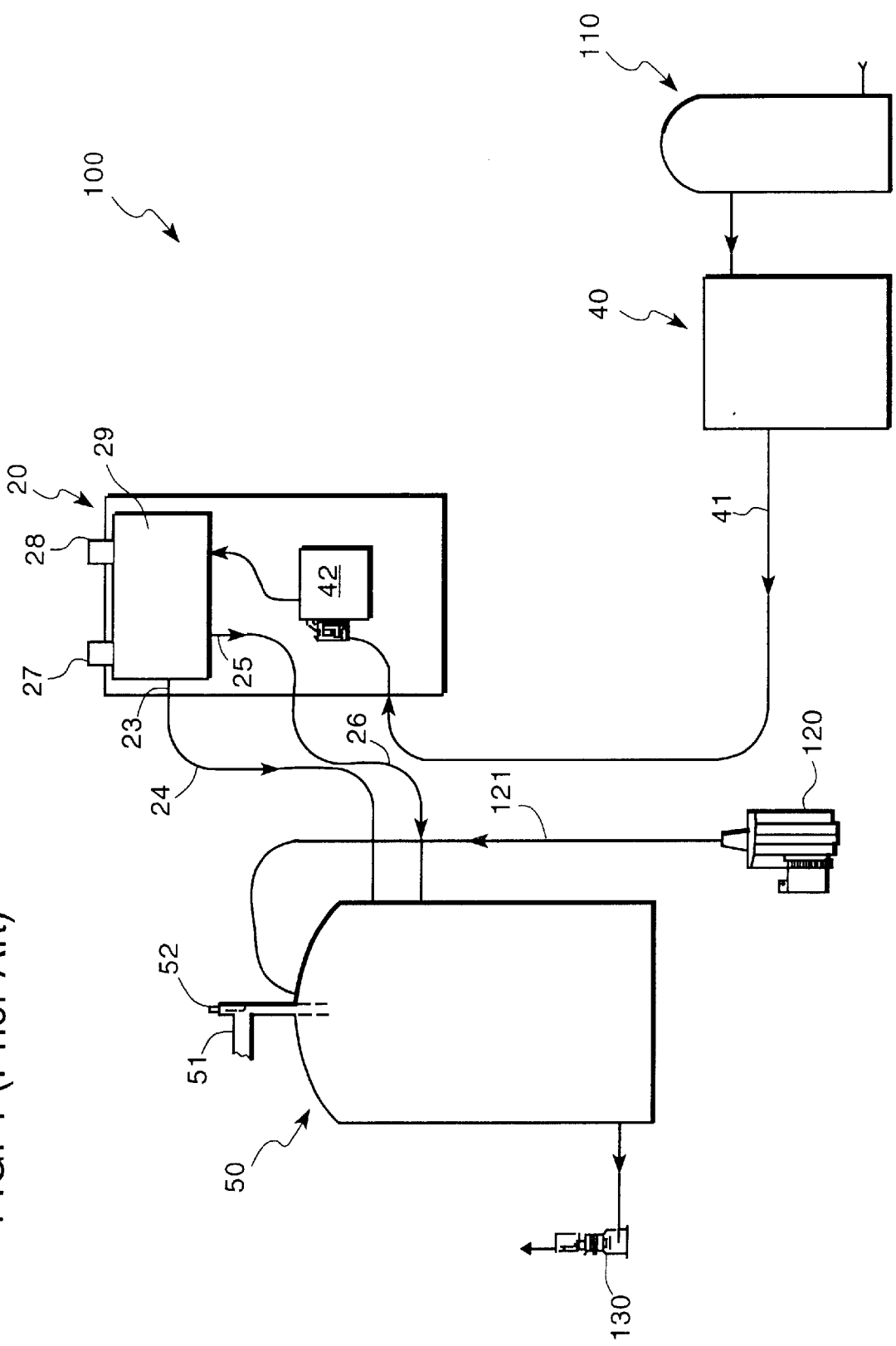
FIG. 1 is a schematic drawing of a prior art hypochlorite production system.

The present invention is directed to an apparatus and method for venting combustible gas from an electrolyzer during the production of hypochlorite. The apparatus provides a mechanism for diluting a combustible gas immediately or soon after it has evolved to a level below the combustible limit for the gas. The method of the present invention provides a technique for efficiently diluting levels of combustible gases to concentrations below their lower explosive limits (LEL). The LEL is the minimum concentration at which the gas will combust explosively in the presence of an ignition source.

Electrolytic production of sodium hypochlorite through the electrolysis of a natural or synthetic brine solution is an efficient and cost effective manner of producing hypochlorite. One of the byproducts of the process, hydrogen gas, is produced in the electrolytic cell in a quantity that may provide a source of combustible or explosive gases above the LEL. The present invention provides an apparatus and method for efficiently diluting hydrogen to below the LEL and then removing the combustible gases from the system in a manner that minimizes the duration and extent of combustible gas throughout the system.

Typically, as a brine solution (electrolyte) is hydrolyzed in an electrolyzer, chlorine is produced at the anode while hydrogen is evolved at the cathode.

At the anode,

$$2\, Cl^- \rightarrow Cl_2 + 2e^- \quad \text{(Eq. 1)}$$

At the cathode,

$$2\, H_2O + 2e^{31} \rightarrow H_2\uparrow + 2\, OH^- \quad \text{(Eq. 2)}$$

When the reactants used are brine and soft water, the product is typically slightly alkaline, for example, at a pH of about 9. In this pH range, the chlorine is predominantly in the form of hypochlorite.

$$Cl_2 + H_2O \rightarrow 2H^+ + Cl^- + OCl^{31} \quad \text{(Eq. 3)}$$

As hydrogen is substantially insoluble in water, it is quickly released from the liquid. Often this results in an accumulation of hydrogen gas in the headspace of the electrolytic cell. Frequently, due to the vigorous evolution of hydrogen, this accumulation is accompanied by a foaming action that provides a mixture of hydrogen gas and bubbles above the level of the electrolyte in the electrolyzer. The invention provides a mechanism for the dilution and removal of hydrogen before it can accumulate to levels above the LEL and may also allow the hydrogen to be purged without a significant loss of product or electrolyte. The invention provides for greater headspace above the electrolyte level relative to conventional hypochlorite production systems. Among other advantages, this increased headspace allows hydrogen to be purged without also discharging a large amount of accompanying foam that would include hypochlorite product and electrolyte.

A secondary source of non-combustible gas may be provided to immediately and completely reduce the concentration of hydrogen inside the electrolyzer to a concentration below its LEL. The non-combustible gas may be provided to the electrolyzer by any source that is capable of supplying the gas at a rate sufficient to reduce the concentration of accumulated hydrogen to below its LEL, which is about 4% by volume in air. Preferably, the non-combustible gas source is able to provide gas at a rate that dilutes the hydrogen in the electrolyzer to a level below about 1% by volume to provide a margin of safety well below the LEL.

Possible sources of non-combustible gas are tanks of compressed gas or a blower that may be powered electrically, mechanically, or pneumatically. Preferably, the secondary gas source is an electrically powered blower because such a device is capable of providing an inexpensive source of non-combustible gas.

It is preferred that the non-combustible gas is non-polluting and non-corrosive. More preferably, the non-combustible gas is nitrogen or air. Most preferably, the secondary gas is air as it is readily available.

Alternatively, the non-combustible gas source may be replaced or supplemented by a vacuum source in fluid communication with the vent so that a partial vacuum is applied to the headspace in the electrolyzer. In such a case, the non-combustible gas source may be eliminated and may be replaced by a simple opening that allows air to enter the head space of the electrolyzer in response to the partial vacuum. The vacuum source may serve to discharge the hydrogen and air mixture to the atmosphere. The vacuum source may be a vacuum pump, a fan, a blower, or any other device capable of reducing the pressure to the level needed to induce the required rate of flow of non-combustible gas to dilute the hydrogen to below the LEL, preferably less than about 1% in the headspace of the electrolyzer. Preferably, the vacuum source is a blower because a blower can provide adequate vacuum at low cost.

As all of the hydrogen gas may not be separated from the product in the electrolyzer, it may be desirable to vent the product storage tank as well, so that any hydrogen that separates from the product at that point is also safely diluted and discharged. Therefore, it may be preferable to vent the diluted hydrogen gas via the storage tank rather than from the electrolyzer itself. In this case, the hydrogen vent may be routed into the product tank headspace, then out to a remote point of discharge so that both the electrolytic cell and storage tank are adequately ventilated. In this manner, a non-combustible dilution gas may be provided throughout the system from near the first point of hydrogen gas production in the electrolyzer and continuously downstream into the storage tank where residual hydrogen may accumulate. This may result in a reduction of the number of locations within the system where hydrogen may build up to above the LEL.

Figure 2:
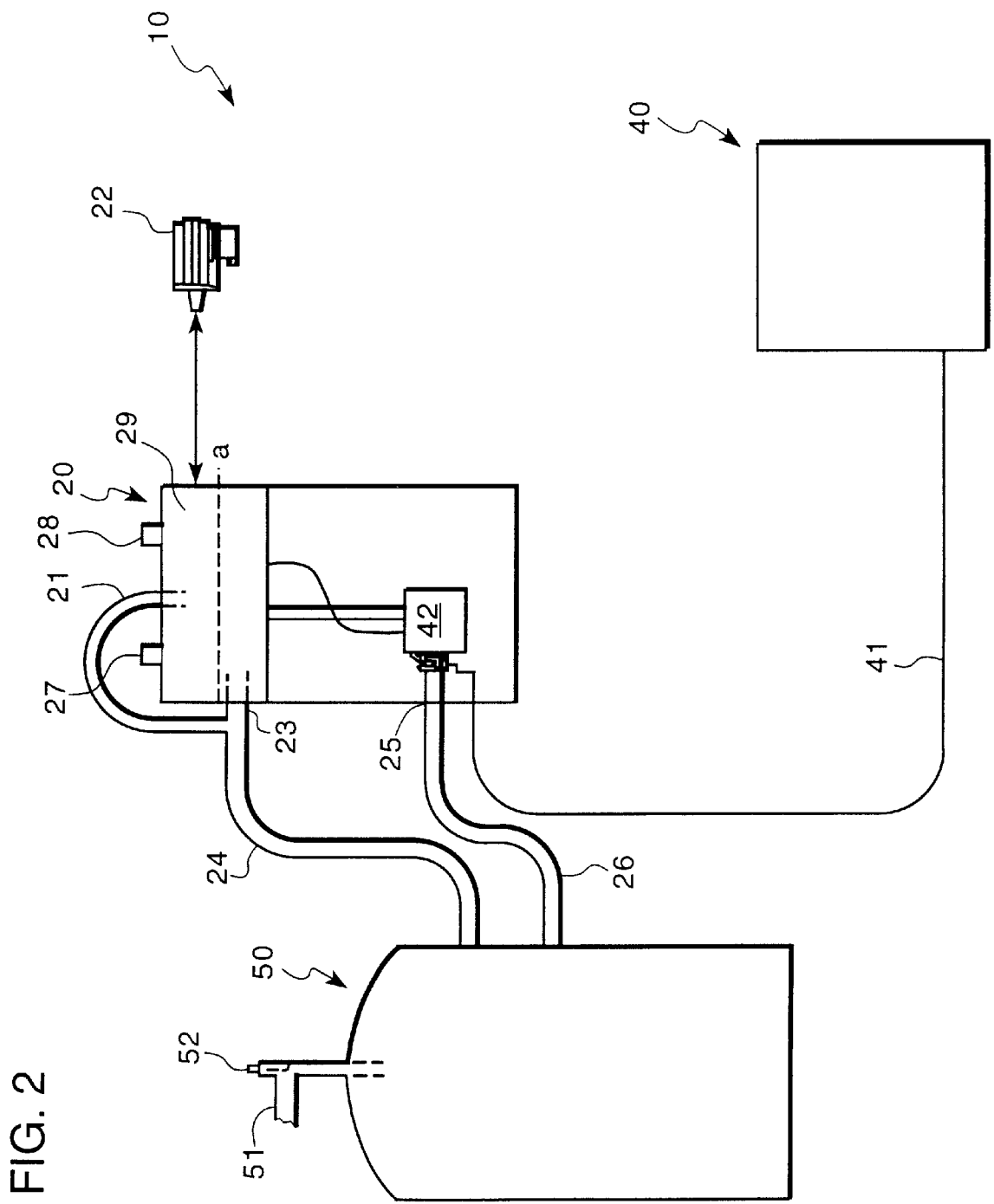
FIG. 2 is a schematic drawing of a system of the present invention.
Figure 3:
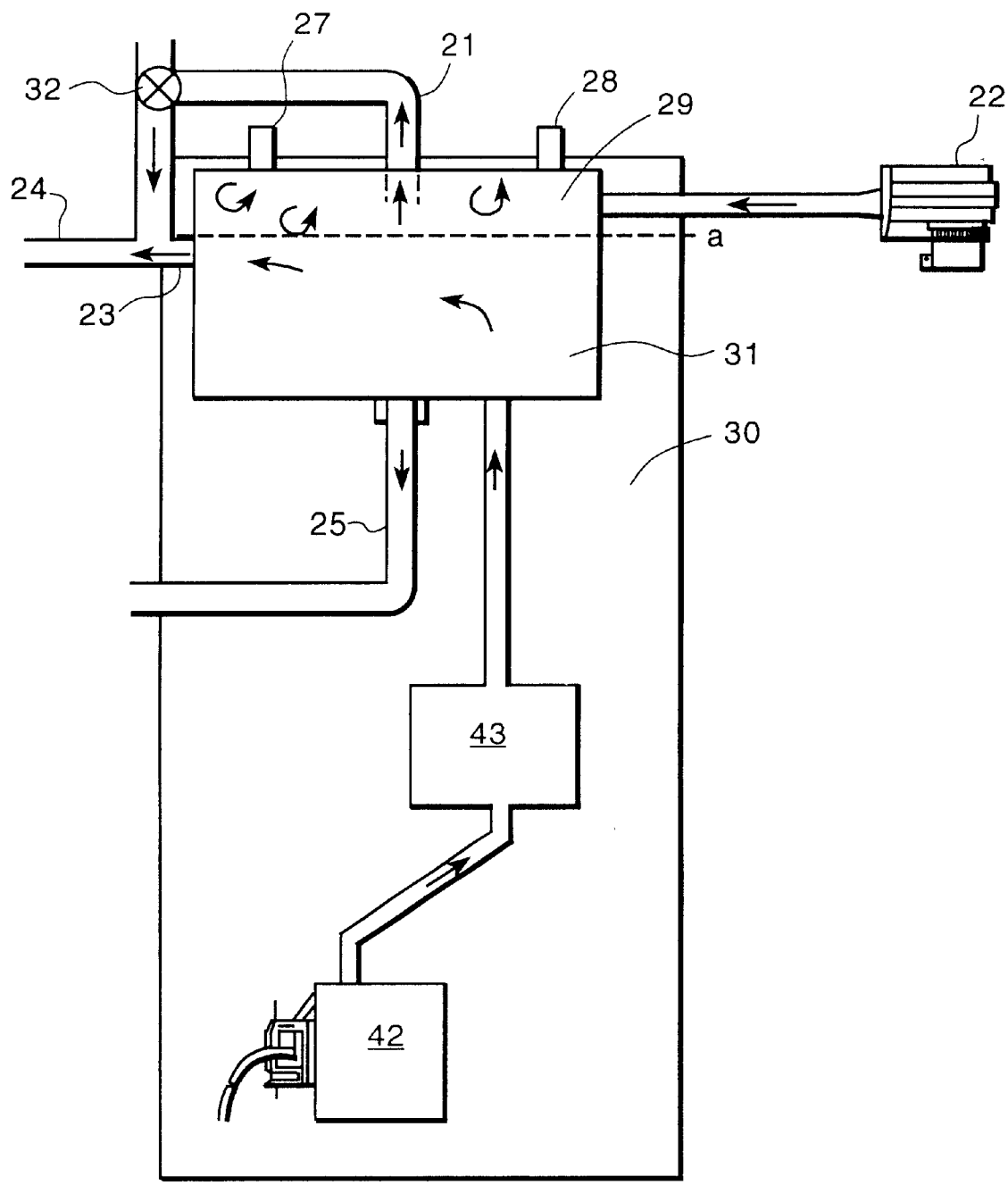
FIG. 3 is a detailed illustration of a portion of the system shown in FIG. 2.

FIG. 2 illustrates one system of the present invention. System 10 includes several modular components, some of which are optional. The illustrated system includes a salt solution that may be either a natural source of brine, for example, sea water, or a synthetic brine, such as that which is made in a salt saturator 40. Preferably, the brine source is a salt saturator because it may provide a purer source of brine than sea water. Referring to FIG. 3, the salt solution is pumped from salt saturator 40 through conduit 41 by pump 42, and is diluted with water from conduit 44 to provide brine containing approximately 3% sodium chloride to the electrolyzer 20 which is mounted on electrolyzer panel 30. Electrolyzer 20 houses an electrolytic cell or cells (not shown) that serve to electrolyze the brine solution and produce the hypochlorite product.

Cathode terminal 27 and anode terminal 28 are each connected to a power supply (not shown) that may provide the current required to proceed with the electrolytic process. The volume in the electrolyzer shown below line "a" is filled with electrolyte solution 31. During the electrolytic procedure, hydrogen gas is formed and accumulates in head space 29 which is the volume in the electrolyzer above line "a." Typically, head space 29 contains a foaming mixture of hydrogen gas and liquid product and/or electrolyte. To possibly reduce the amount of foam that is removed from electrolyzer 20, headspace 29 should be at least about 2 inches in height and preferably at least about 3 inches in height to assure minimum carryover of electrolyte. System capacity and system configuration are two factors that may be considered when determining the optimal amount of headspace. This added height may allow the foam to break prior to its reaching vent 21 at the top of the electrolyzer. Vent 21 provides a passageway through the electrolyzer for gas produced in the electrolytic cell to pass from the interior of the electrolyzer to the exterior of the electrolyzer.

Non-combustible gas source 22 provides a non-combustible gas to headspace 29. Non-combustible gas source 22 may be any device capable of delivering a non-combustible gas to the headspace of the electrolyzer. Preferably, it is a fan or other mechanical device that may be electrically or pneumatically driven. Most preferably, it is a centrifugal blower powered by an electric motor and is capable of delivering the non-combustible gas at a rate of greater than 500 SCF per pound of chlorine produced for a system that is about 50% efficient in the production of chlorine. It may also be advantageous to determine the rate of non-combustible gas flow by monitoring the electrolytic current, for example, 27 Amps per lb/day of chlorine produced.

The non-combustible secondary gas is supplied to head space 29 at a rate adequate to dilute the hydrogen in the headspace 29 of the electrolyzer to a concentration that is below the LEL of hydrogen. Preferably, the concentration of hydrogen is reduced to a level below about 4% by volume in air and most preferably is reduced to a level below about 1% by volume in air.

After the mixture of non-combustible gas, hydrogen, and any other gases that may be produced during the electrolytic procedure passes through vent 21, it may be routed to enter storage tank 50 and mix with gas that may be present in the headspace above the stored liquid. In product storage tank 50, the mixture of gases, including any additional hydrogen that separates from the product in the storage tank, is released to the atmosphere through vent 51. A positive flow outside vent 51 may be maintained by the pressure provided by non-combustible gas source 22 to the upstream side of the system.

Flow sensor 52 may provide additional assurance that the purging system is operating properly and at adequate flow. Any type of fluid flow sensor may be used. For example, a mass flow detector, an anemometer, a pitot tube, a displacement-type switch (see FIGS. 1 and 2) and the like, may be employed. Preferably, the flow sensor is a differential pressure orifice-type system, such as a plate-type orifice with a differential pressure switch that may be used to detect the pressure drop at the vent. This type of sensor has been shown to be accurate and reliable. Flow sensor 52 may be part of a feedback system (not shown) that may serve to monitor and control the level of hydrogen in the system. For example, flow sensor 52 may be connected to a pressure differential switch that may, if an inadequate pressure differential is detected, increase the flow of non-combustible gas provided by gas source 22, activate an alarm, or shut down the system. Alternately, a similar flow sensor might be placed at vent 21 to monitor the flow and concentration of combustible gas if gas is vented from the electrolyzer at this point.

A combustible gas sensor, or sensors, may be placed throughout the system, in particular, at the vent, to further verify that the concentration of hydrogen gas does not exceed the LEL (not shown). The gas sensors may function as input devices to provide an input signal representing the hydrogen concentration to a controller. If a predetermined level, for example, the LEL or a level such as 1% or 4%, is approached or exceeded, the controller may send a control signal to the gas source 22 that causes the flow from gas source 22 to increase in order to further dilute the hydrogen in the system. For example, the signal may increase or decrease the speed of a vacuum or blower motor and/or may vary the flow of non-combustible gas from a compressed gas source. If the response is inadequate to dilute the hydrogen, or if the non-combustible gas source fails, the controller may shut down the system to avoid an unsafe condition. In addition, combustible gas sensors may be placed throughout the structure that houses the system to assure that levels of combustible gas do not build up externally of the system.

In this manner, hydrogen that is produced during the electrolytic process is diluted to below its combustible limit soon after it is produced and is kept below its combustible limit downstream of the point of production and through a point of storage. Thus, not only is the storage tank vented to the atmosphere but the electrolyzer itself, a possible source of ignition, is also adequately purged of combustible gases.

When the system ceases production, for example when the level in product tank 50 reaches an adequate level, non-combustible gas source 22 continues to function and to further purge electrolyzer 20. If desired, the product remaining in electrolyzer 20 may be drained through drain cell 25, through conduit 26 and into product storage tank 50. The continued use of gas source 22 may assure that electrolyzer 20 is properly purged as the level of product solution is reduced below the level of the electrolytic cell. This feature may be particularly useful when electrolyte is removed from the cells in order to reduce cell corrosion.

In one aspect, the electrolyzer is provided with a retention area in which no electrolytic activity occurs. This retention area provides a zone in which combustible gas is allowed to dissipate from the electrolyte solution and in which no additional combustible gas is produced. If the retention area is part of the electrolyzer, it may be vented through a vent in common with the electrolytic cells. The use of a retention area provides for the use of a single vent, at the electrolyzer, without the need for additional venting downstream. This eliminates the possibility of combustible gas leaks in piping or storage tanks that are downstream of the electrolyzer. The retention area holds the hypochlorite solution for a period adequate to allow enough hydrogen to be vented from the solution to avoid a hazardous condition downstream of the retention area. In combination with a headspace expander, more than 99% of the combustible gas produced can be diluted and vented directly from the electrolyzer. Preferably, the retention area provides for at least one minute of hydraulic retention time and more preferably, the retention area provides for at least five minutes of hydraulic retention time. Hydraulic retention time is herein defined as the average residence time of fluid entering the retention area. Thus, the retention volume should be sized, at least in part, based on the output of the system. Dilution and venting of the evolved hydrogen may be aided by including a non-combustible gas source, such as an electric blower, upstream of the vent, which assures that the mixture in the headspace expander is below the LEL. Alternatively, a vacuum source, such as an electric blower, may be placed downstream of the vent.

Figure 5:
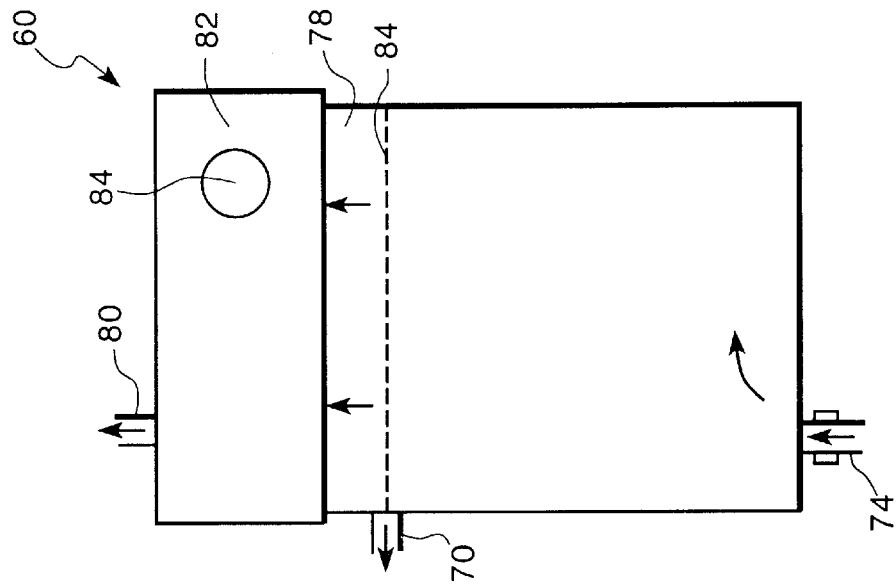
FIG. 5 provides a side view of the embodiment of FIG. 4.
Figure 4:
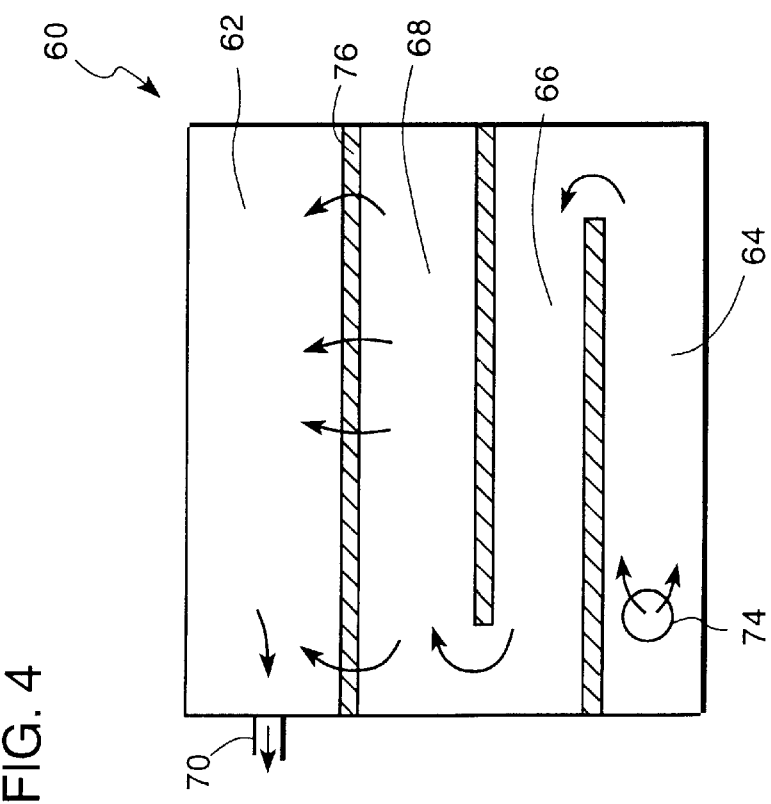
FIG. 4 provides a top view of one embodiment of the invention.

FIGS. 4 and 5 illustrate, in top view and side view, respectively, one embodiment of the invention employing a retention area. In addition to one or more electrolytic cells, 64, 66 and 68, electrolyzer 60 is equipped with a retention area, specifically, compartment 62. Compartment 62 is sized to provide 5 minutes of hydraulic retention time at the output rate of the system.

Brine solution is fed into electrolyzer 60 through inlet 74, located at the bottom of the electrolyzer, and proceeds through electrolytic cells 64, 66 and 68 where electrolytic generation of hypochlorite occurs. Hydrogen is produced concurrently with the hypochlorite, as outlined above, and much of the hydrogen is vented to the headspace of the electrolyzer. A portion of the hydrogen produced, however, is temporarily retained in the electrolyte.

When the fluid level 84 in cell 68 reaches the level of the top of partition 76, electrolyte flows over partition 76 and is retained in compartment 62. There is no electrolytic activity in compartment 62 so no additional formation of hydrogen occurs in this compartment. While the solution is held quiescent, hydrogen is released from the liquid and enters headspace 78 above compartment 62 where it can be diluted and removed. Compartment 62 shares common headspace 78 with electrolytic cells 64, 66 and 68, and a single vent 80 is capable of providing an outlet for all of the hydrogen produced. Dilution to below the LEL and removal of the hydrogen in the common headspace is all that is necessary to assure that the entire system remains free of combustible gas mixtures. Thus, concern for leaks downstream of the electrolyzer is eliminated. Headspace expander 82 provides a gas dilution area as well as an area for foam to break. Outlet 70 provides a conduit for hypochlorite solution to be conveyed to a storage tank or to a point of use. In this embodiment, venting downstream of outlet 70 is unnecessary as substantially all, about 99.9%, of the hydrogen is removed from the solution while it is retained in the electrolyzer.

The 5 minute volume for systems of various capacity is provided below.

| System Flow (GPH) | 5 Minute Volume (in$^3$) |
|---|---|
| 4.50 | 78 |
| 8.10 | 156 |
| 12.15 | 234 |
| 16.20 | 312 |
| 20.25 | 390 |

The invention may be further understood with reference to the following example. This example is intended to serve as an illustration and not a limitation of the present invention as defined in the claims herein.

EXAMPLE

An OSEC®-LC three-celled electrolytic sodium hypochlorite production system (United States Filter Corporation, Palm Desert, Calif.) was retrofitted to evaluate one aspect of the invention. The system was configured to produce about 26.4 pounds of chlorine, as hypochlorite, per day. Saturated brine solution containing about 30% chloride was diluted by 90% with softened water to obtain a brine solution containing approximately 3% sodium chloride. The system was operated at 224 amps at about 3.1 V per cell, or about 9.3 V total for the 3-cell electrolyzer.

As hypochlorite production is not 100% efficient, the amount of hydrogen produced could not be accurately calculated based on the amount of chlorine produced and instead of producing a theoretical 5.5 SCF of hydrogen per pound of chlorine produced, it was found that about 9.1 SCF of hydrogen were evolved per pound of chlorine. Thus, to obtain the goal of diluting the hydrogen to about 1% by volume in air, air was fed through the system at a rate of about 24,024 SCF per day (9.1 SCF $H_2$/lb Cl×26.4 lb Cl/day×100). 24,024 SCF per day is equivalent to 24,024 SCF×1/24×1/60, or 16.7 SCF per minute. The flow rate of the air was monitored to assure that the quantity of air being pumped through the system was adequate to maintain a dilution factor of 1:100. Thus, the system was capable of diluting the hydrogen concentration to below the LEL and, in fact, diluted the hydrogen to a level of about 1% by volume in air.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. An electrolyzer comprising:

an electrolyte inlet and a product outlet;

at least one electrolytic cell positioned in the electrolyzer; and a retention area positioned within the electrolyzer and downstream of the at least one electrolytic cell.

2. The electrolyzer of claim 1 further comprising a vent in fluid communication with the electrolyzer.

3. The electrolyzer of claim 2 further comprising a non-combustible gas source in fluid communication with the electrolyzer.

4. The electrolyzer of claim 3 wherein the non-combustible gas is air.

5. The electrolyzer of claim 3 wherein the non-combustible gas is carbon dioxide.

6. The electrolyzer of claim 3 further comprising a controller and an input device to provide an input signal which represents a hydrogen concentration at the vent wherein the controller converts said input signal to a gas source control signal that causes the gas source to operate at a rate which dilutes the hydrogen concentration at the vent to a desired level.

7. The electrolyzer of claim 2 further comprising a vacuum source in fluid communication with the electrolyzer.

8. The electrolyzer of claim 7 further comprising a controller and an input device to provide an input signal which represents a hydrogen concentration at the vent wherein the controller converts said input signal to a vacuum source control signal that causes the vacuum source to operate at a rate which dilutes the hydrogen concentration at the vent to a desired level.

9. The electrolyzer of claim 1 wherein the retention area is sized to hold at least a five minute retention volume.

10. A system comprising:

an electrolyzer having at least one electrolytic cell in fluid communication with a product outlet and a brine inlet;

a storage tank positioned downstream of the product outlet;

a vent positioned on the storage tank and in fluid communication with the electrolyzer; and a non-combustible gas source in fluid communication with the electrolyzer.

11. The system of claim 10 wherein the system is vented to the atmosphere.

12. The system of claim 11 wherein the non-combustible gas source is supplied at an elevated pressure to a headspace in the electrolyzer.

13. The system of claim 10 further comprising a retention area positioned in the electrolyzer.

14. The system of claim 10 comprising a vacuum source downstream of the storage tank.

15. A method comprising supplying a brine solution to an electrolytic cell in an electrolyzer;

producing hypochlorite ion and hydrogen gas in the electrolyzer;

introducing a non-combustible gas into the electrolyzer;

flowing at least a portion of the non-combustible gas from the electrolyzer to a storage tank; and venting the non-combustible gas from the storage tank.

16. The method of claim 15 wherein the hydrogen is diluted to a concentration of less than about 4% by volume in air.

17. The method claim 16 wherein the hydrogen is diluted to a concentration of less than about 1% by volume in air.

18. The method of claim 16 wherein the non-combustible gas is introduced into the electrolyzer at a rate of at least about 100 CFM per CFM of hydrogen gas produced.

19. The method of claim 15 comprising a step of adjusting a flow rate of a non-combustible gas in response to a concentration of hydrogen in the gas being vented from the storage tank.

20. The method of claim 15 wherein the non-combustible gas is air.

21. The method of claim 15 wherein the non-combustible gas is nitrogen.

22. The method of claim 15 wherein the non-combustible gas is carbon dioxide.

* * * * *